US012738418B2

(12) United States Patent
Sugita

(10) Patent No.: US 12,738,418 B2
(45) Date of Patent: Sep. 15, 2026

(54) MULTILAYER CERAMIC CAPACITOR

(71) Applicant: Murata Manufacturing Co., Ltd., Nagaokakyo (JP)

(72) Inventor: Hiroaki Sugita, Nagaokakyo (JP)

(73) Assignee: MURATA MANUFACTURING CO., LTD., Kyoto (JP)

(*) Notice: Subject to any disclaimer, the term of this patent is extended or adjusted under 35 U.S.C. 154(b) by 140 days.

(21) Appl. No.: 18/788,202

(22) Filed: Jul. 30, 2024

(65) Prior Publication Data

US 2025/0062073 A1 Feb. 20, 2025

Related U.S. Application Data

(63) Continuation of application No. PCT/JP2023/029904, filed on Aug. 18, 2023.

(51) Int. Cl.

| | |
|---|---|
| ***H01G 4/012*** | (2006.01) |
| ***H01G 4/12*** | (2006.01) |
| ***H01G 4/232*** | (2006.01) |
| ***H01G 4/30*** | (2006.01) |

(52) U.S. Cl.

CPC ........... *H01G 4/012* (2013.01); *H01G 4/1227* (2013.01); *H01G 4/1236* (2013.01); *H01G 4/2325* (2013.01); *H01G 4/30* (2013.01)

(58) Field of Classification Search

CPC .... H01G 4/012; H01G 4/1227; H01G 4/1236; H01G 4/2325; H01G 4/30

See application file for complete search history.

(56) References Cited

U.S. PATENT DOCUMENTS

| | | | | |
|---|---|---|---|---|
| 4,771,520 | A | 9/1988 | Tanaka et al. | |
| 2008/0304204 | A1 | 12/2008 | Suzuki | |
| 2011/0216472 | A1* | 9/2011 | Nakamura | H01G 4/06 361/321.4 |
| 2012/0250221 | A1* | 10/2012 | Yamashita | H01G 4/228 361/321.2 |
| 2014/0125194 | A1* | 5/2014 | Lee | H01G 4/012 336/200 |
| 2017/0330686 | A1* | 11/2017 | Sugita | H01G 4/0085 |
| 2019/0362895 | A1* | 11/2019 | Kobayashi | H01G 4/2325 |

FOREIGN PATENT DOCUMENTS

| | | | |
|---|---|---|---|
| JP | S61248413 | A | 11/1986 |
| JP | H11111553 | A | 4/1999 |
| JP | 2009016796 | A | 1/2009 |
| JP | 2009224503 | A | 10/2009 |
| JP | 2012227197 | A | 11/2012 |

OTHER PUBLICATIONS

International Search Report in PCT/JP2023/029904, mailed Sep. 26, 2023, 4 pages.

Written Opinion in PCT/JP2023/029904, mailed Sep. 26, 2023, 6 pages.

* cited by examiner

*Primary Examiner* — Michael P McFadden

(74) *Attorney, Agent, or Firm* — Keating & Bennett, LLP

(57) ABSTRACT

A multilayer ceramic capacitor includes a multilayer body, first internal electrode layers exposed at a first end surface of the multilayer body, and second internal electrode layers exposed at a second end surface of the multilayer body. The first internal electrode layers are exposed at a first lateral surface and a second lateral surface of the multilayer body. The second internal electrode layers are exposed at the first lateral surface and the second lateral surface of the multilayer body.

22 Claims, 8 Drawing Sheets

10
IV–IV CROSS-SECTIONAL VIEW
15b1
15a
15b2
VI
VII
20b
12f
22b
30b
32b
34b
30a
32a
34a
12
12a
12b
12e
14
16a
16b
18a
18b
20a
34 {34a 34b
32 {32a 32b
30 {30a 30b
20 {20a 20b
16 {16a 16b
x
z

V-V CROSS-SECTIONAL VIEW 10
16a
18a
$C_1$
12d
12
16a2
25a
30b
32b
34b
14
20b
12f
16b
30a
32a
34a
20a
12e
WE2
WE1
18b
12c
16a1
23a
VI-VI CROSS-SECTIONAL VIEW
16 16a 16b
20 20a 20b
30 30a 30b
32 32a 32b
34 34a 34b
y
z

10
VII-VII CROSS-SECTIONAL VIEW
WE4
WE3
20b
12f
30b
32b
34b
25b
16b2
12
12d
$C_2$
18b
16b
30a
32a
34a
14
20a
12e
16a
23b
16b1
12c
18a
34
34a
34b
32
32a
32b
30
30a
30b
20
20a
20b
16
16a
16b
z
y 12
16
16c
16a
16b
12e
12f
26c
26c
16 16a 16b 16c 12
16c
16c
16
16a
16b
12e
12f
26c
26c
26c
16 16a 16b 16c 12
16c
16c
16c
16
16a
16b
12e
12f
26c
26c
26c
26c
16 16a 16b 16c

MULTILAYER CERAMIC CAPACITOR

CROSS REFERENCE TO RELATED APPLICATIONS

This application claims the benefit of priority to PCT/JP2023/029904 filed on Aug. 18, 2023. The entire contents of this application are hereby incorporated herein by reference.

BACKGROUND OF THE INVENTION

1. Field of the Invention

The present invention relates to multilayer ceramic capacitors.

2. Description of the Related Art

In recent years, multilayer ceramic capacitors having larger capacitance and smaller size have been in demand. Such multilayer ceramic capacitors have, for example, a multilayer body having a rectangular parallelepiped shape in which dielectric layers, on which internal electrodes are printed, and internal electrodes are alternately laminated, and on top and bottom surfaces thereof, ceramic layers, which form outer layers, are laminated. The multilayer ceramic capacitors further have external electrodes formed on opposite end surfaces of the multilayer body.

Some multilayer ceramic capacitors having such a configuration have dielectric layers referred to as side margin portions formed on lateral surfaces of the multilayer body to prevent the internal electrodes from making contact with the external electrodes at the lateral surfaces.

Japanese Unexamined Patent Application, Publication No. S61-248413 discloses a manufacturing method for a multilayer ceramic capacitor having side margin portions such as described above. In this manufacturing method, a mother multilayer body is first formed by laminating ceramic green sheets each having, on a surface thereof, an electrically conductive film that serves as an internal electrode. The mother multilayer body is then cut to yield multilayer body chips so that the electrically conductive films are exposed at the lateral surfaces where no external electrode is formed. A ceramic slurry is then applied to the internal electrodes exposed at opposite sides of each of the thus obtained multilayer body chips to serve as side margin portions.

However, there are some disadvantages in a configuration such as that disclosed in Japanese Unexamined Patent Application, Publication No. S61-248413, which has side margin portions formed by applying a ceramic slurry as a material of the side margin portions to the internal electrodes exposed at opposite sides of the multilayer body chip obtained by cutting the mother multilayer body. That is, this configuration has a smaller effective area of the internal electrodes because the internal electrodes are not provided in the side margin portions. Furthermore, this configuration requires an additional side margin portion forming step, increasing manufacturing costs.

SUMMARY OF THE INVENTION

Example embodiments of the present invention provide multilayer ceramic capacitors that each enable a reduction in manufacturing costs while achieving an increase in an effective area of internal electrodes, which contribute to generation of capacitance.

A multilayer ceramic capacitor according to an example embodiment of the present invention includes a multilayer body including a plurality of dielectric layers laminated in a lamination direction, the multilayer body including a first main surface and a second main surface opposed to each other in the lamination direction, a first lateral surface and a second lateral surface opposed to each other in a width direction orthogonal or substantially orthogonal to the lamination direction, and a first end surface and a second end surface opposed to each other in a length direction orthogonal or substantially orthogonal to the lamination direction and the width direction, first internal electrode layers on top of the dielectric layers and exposed at the first end surface, second internal electrode layers on the dielectric layers and exposed at the second end surface, a first external electrode including a base electrode layer on the first end surface and a plated layer disposed on the base electrode layer, and a second external electrode including a base electrode layer on the second end surface and a plated layer on the base electrode layer. The first internal electrode layers are exposed at the first lateral surface and the second lateral surface. The second internal electrode layers are exposed at the first lateral surface and the second lateral surface.

This configuration enables the multilayer ceramic capacitors according to example embodiments of the present invention to achieve an increase in the effective area of internal electrode layers, which contribute to generation of capacitance of the capacitor, since the first internal electrode layers are exposed at the first lateral surface and the second lateral surface. This configuration also eliminates the need for forming dielectric layers at the ends in the width direction, thus, enabling a reduction in manufacturing costs for the multilayer ceramic capacitor.

According to example embodiments of the present invention, it is possible to provide multilayer ceramic capacitors that each enable a reduction in manufacturing costs while achieving an increase in the effective area of internal electrodes, which contribute to generation of capacitance.

The above and other elements, features, steps, characteristics and advantages of the present invention will become more apparent from the following detailed description of the example embodiments with reference to the attached drawings.

DETAILED DESCRIPTION OF THE EXAMPLE EMBODIMENTS

The following describes multilayer ceramic capacitors according to example embodiments of the present invention as an example of the present invention with reference to the drawings.

1. Multilayer Ceramic Capacitor

Figure 1:
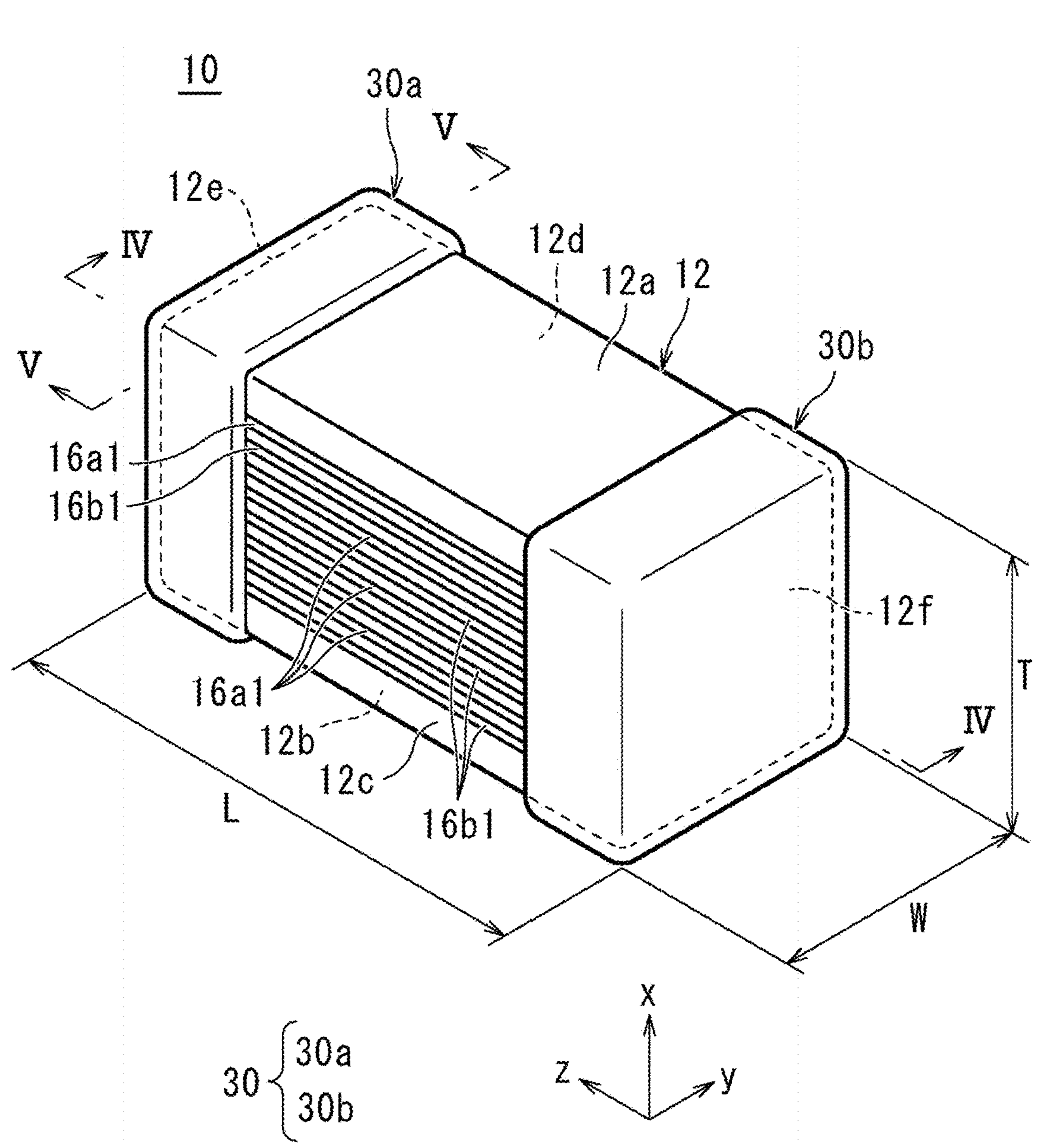
FIG. 1 is an external perspective view of a multilayer ceramic capacitor, which is an example of a multilayer ceramic capacitor according to an example embodiment of the present invention.
Figure 2:
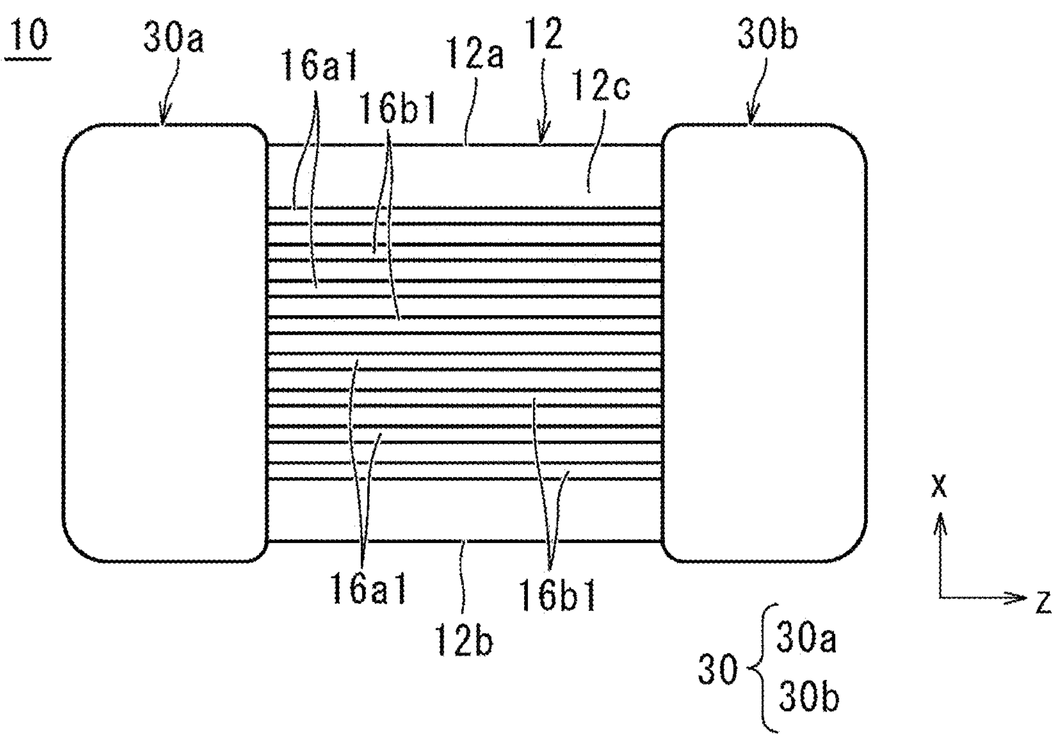
FIG. 2 is a front view of the multilayer ceramic capacitor in FIG. 1, which is an example of the multilayer ceramic capacitor to an example embodiment of the present invention.
Figure 3:
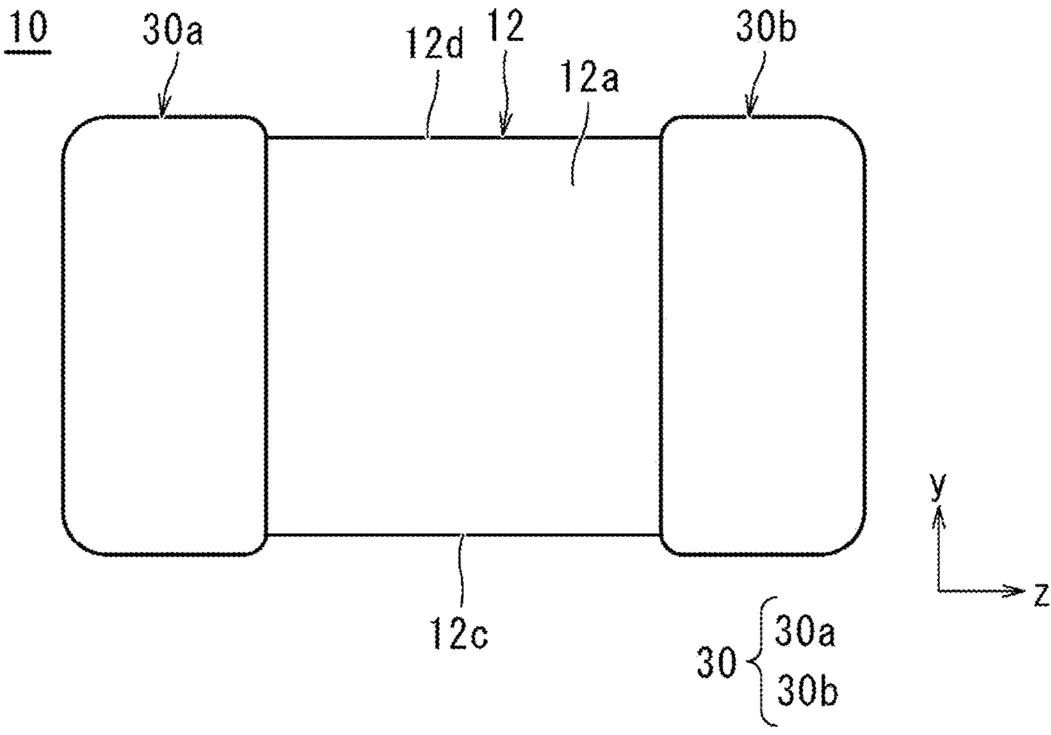
FIG. 3 is a plan view of the multilayer ceramic capacitor in FIG. 1, which is an example of the multilayer ceramic capacitor according to an example embodiment of the present invention.
Figure 4:
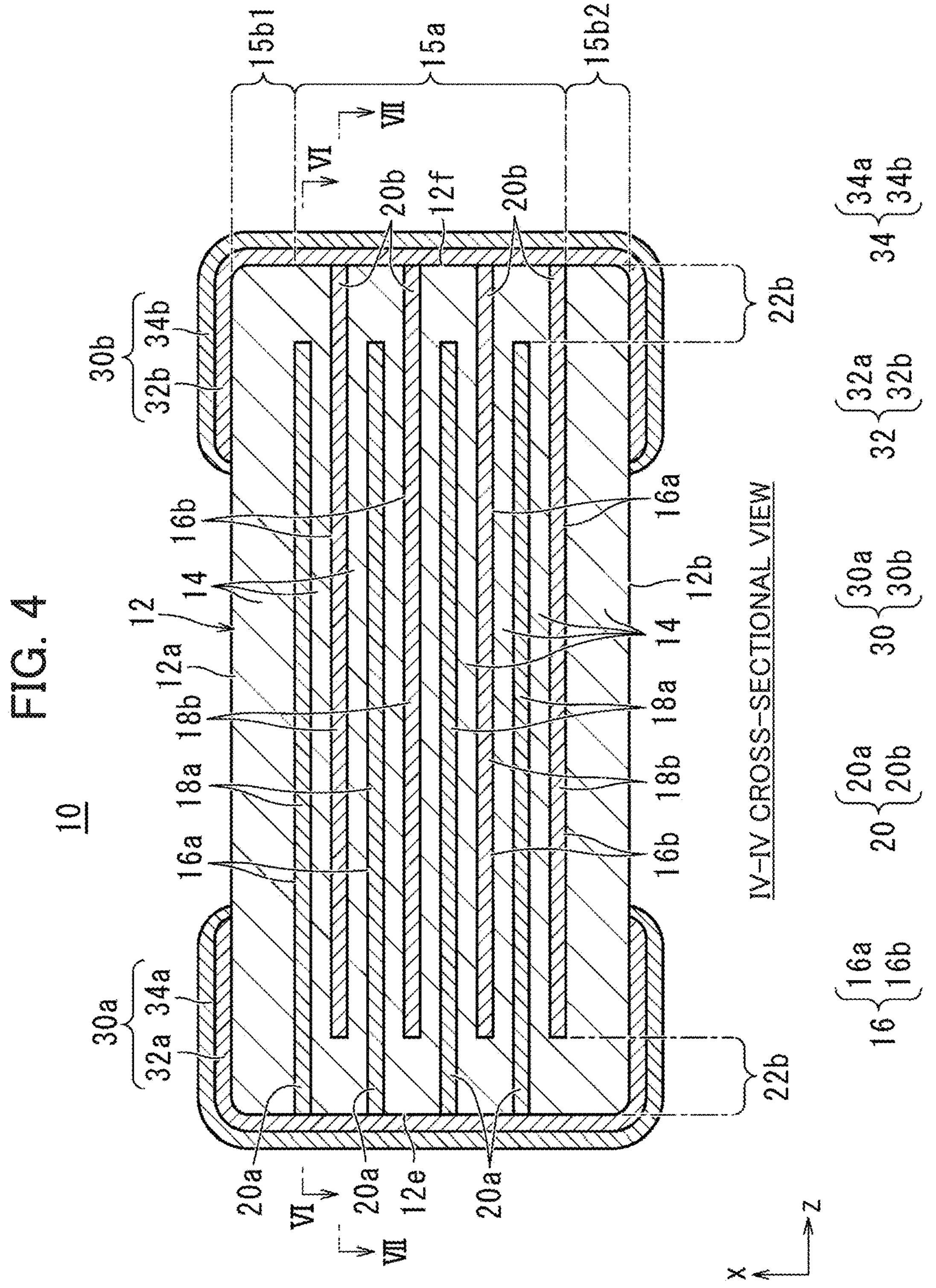
FIG. 4 is a schematic cross-sectional view taken along line IV-IV in FIG. 1.
Figure 5:
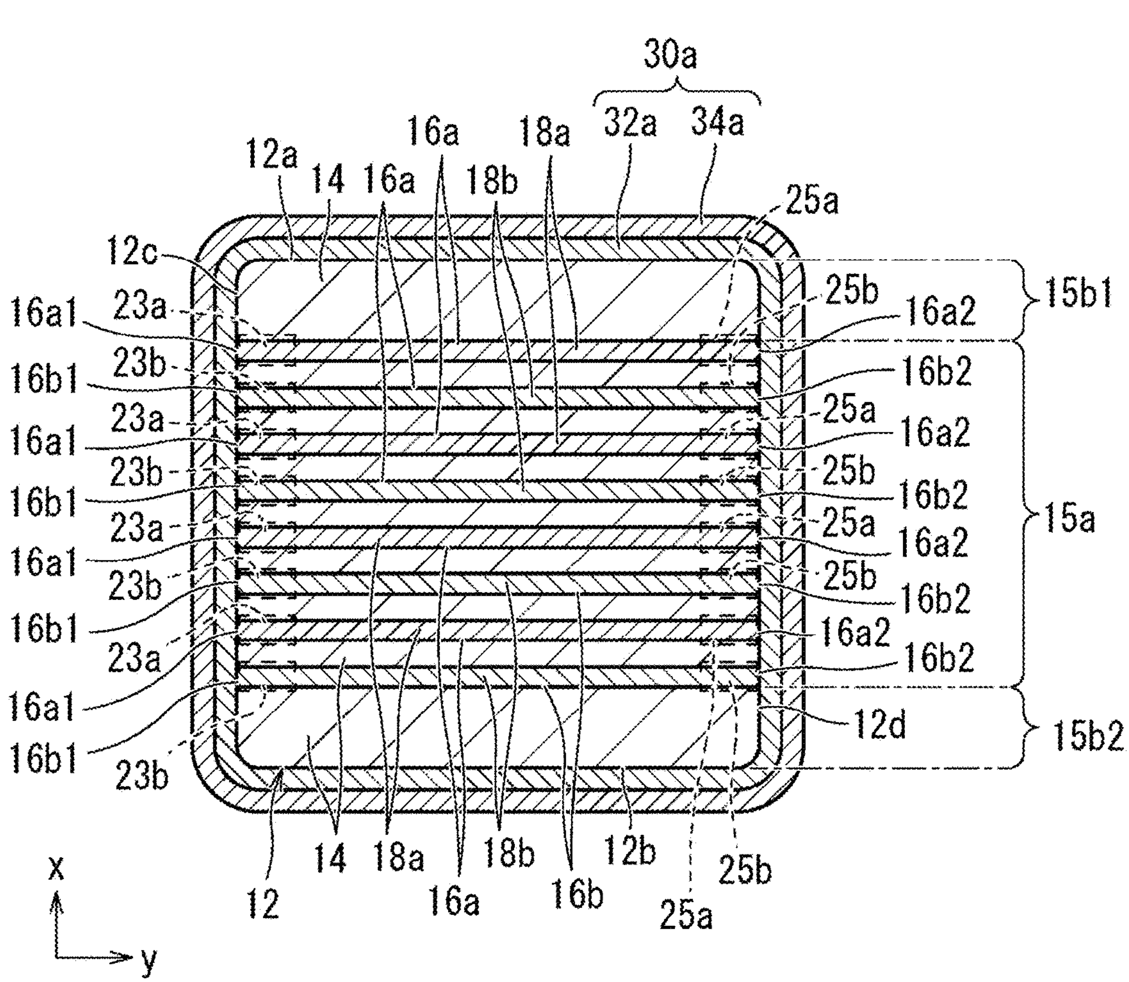
FIG. 5 is a schematic cross-sectional view taken along line V-V in FIG. 1.
Figure 6:
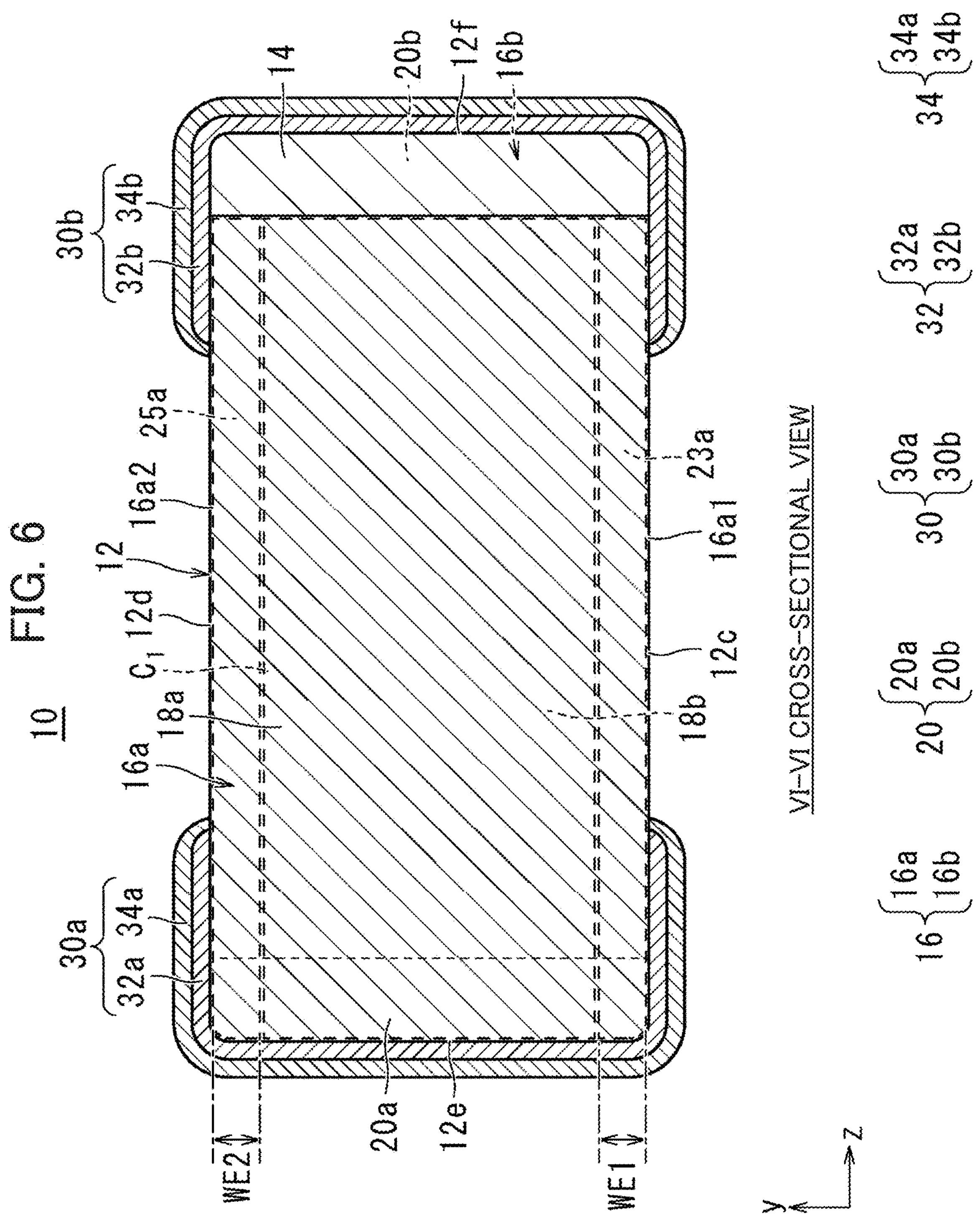
FIG. 6 is a schematic cross-sectional view taken along line VI-VI in FIG. 4.
Figure 7:
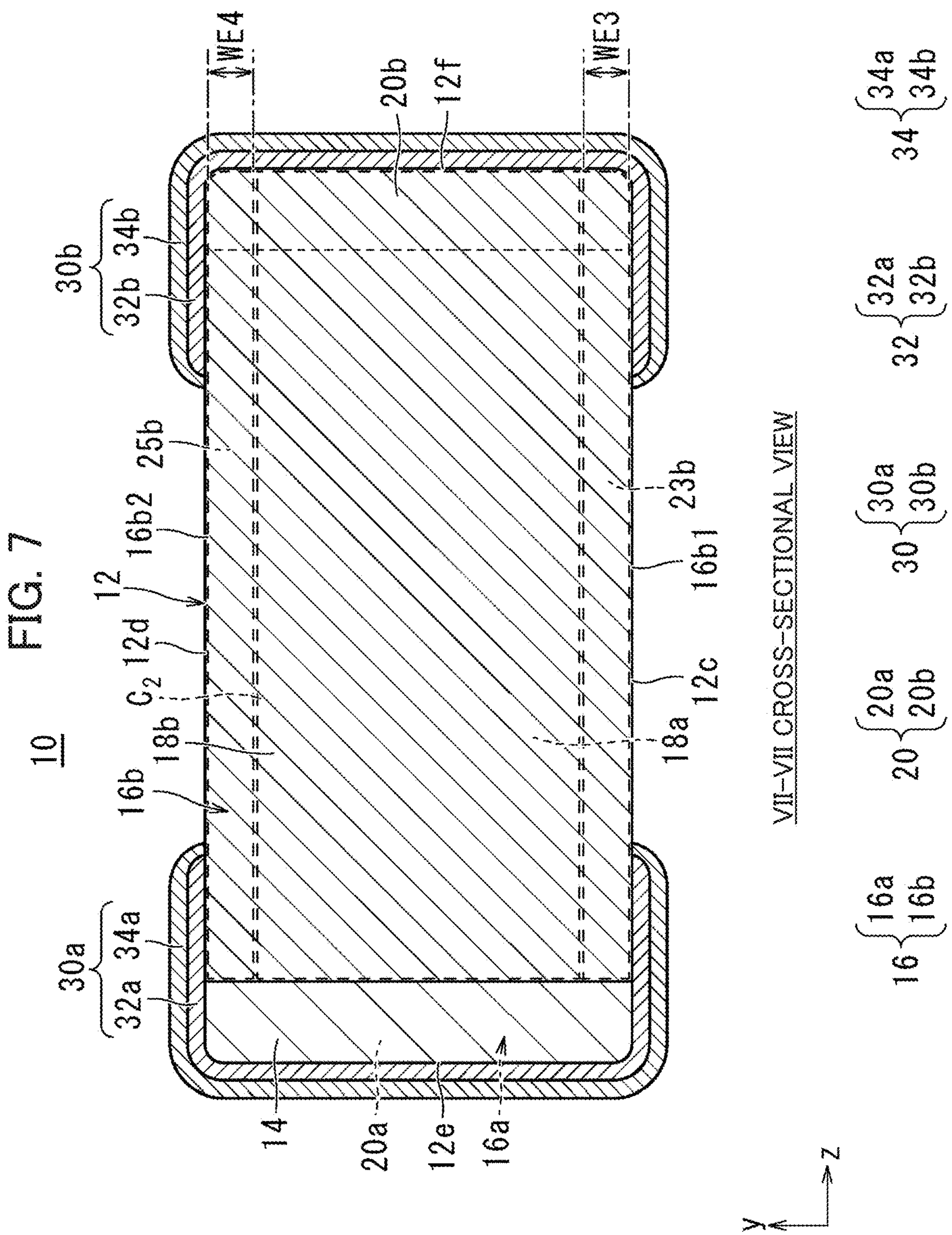
FIG. 7 is a schematic cross-sectional view taken along line VII-VII in FIG. 4.

A multilayer ceramic capacitor 10 will be described, which is an example of a multilayer ceramic capacitor according to an example embodiment of the present invention. FIG. 1 is an external perspective view of a multilayer ceramic capacitor, which is an example of the multilayer ceramic capacitor according to an example embodiment of the present invention. FIG. 2 is a front view of the multilayer ceramic capacitor, which is an example of the multilayer ceramic capacitor according to an example embodiment of the present invention. FIG. 3 is a plan view of the multilayer ceramic capacitor, which is an example of the multilayer ceramic capacitor according to an example embodiment of the present invention. FIG. 4 is a schematic cross-sectional view taken along line IV-IV in FIG. 1. FIG. 5 is a schematic cross-sectional view taken along line V-V in FIG. 1. FIG. 6 is a schematic cross-sectional view taken along line VI-VI in FIG. 4. FIG. 7 is a schematic cross-sectional view taken along line VII-VII in FIG. 4.

The multilayer ceramic capacitor 10 includes a multilayer body 12 and external electrodes 30. The multilayer body 12 includes an inner layer portion 15*a* that generates capacitance, and a first outer layer portion 15*b*1 and a second outer layer portion 15*b*2 that are arranged to hold the inner layer portion 15*a* therebetween from top and bottom main surfaces. In the inner layer portion 15*a*, a plurality of dielectric layers 14 and a plurality of internal electrode layers 16 are alternately laminated.

The following describes configurations of the multilayer body 12, the internal electrode layers 16, and the external electrodes 30 in the stated order.

Multilayer Body

The multilayer body 12 includes the plurality of dielectric layers 14 and the plurality of internal electrode layers 16 that are laminated on one another. Furthermore, the multilayer body 12 includes a first main surface 12*a* and a second main surface 12*b* opposed to each other in a height direction x, which is the lamination direction of the plurality of dielectric layers 14, a first lateral surface 12*c* and a second lateral surface 12*d* opposed to each other in a width direction y, which is orthogonal or substantially orthogonal to the height direction x, and a first end surface 12*e* and a second end surface 12*f* opposed to each other in a length direction z, which is orthogonal or substantially orthogonal to the height direction x and the width direction y. The length direction z is also defined as an L direction connecting the first end surface 12*e* and the second end surface 12*f*. The width direction y is also defined as a W direction connecting the first lateral surface 12*c* and the second lateral surface 12*d*. The height direction x is also defined as a T direction connecting the first main surface 12*a* and the second main surface 12*b*.

The multilayer 12 has a rectangular or body substantially orthogonal parallelepiped shape. The "rectangular parallelepiped shape" encompasses a rectangular parallelepiped shape including rounded corner portions and ridge portions. The corner portions each refer to a portion where three adjacent surfaces of the multilayer body 12 intersect, and the ridge portions each refer to a portion where two adjacent surfaces of the multilayer body 12 intersect. That is, a member having a "rectangular parallelepiped shape" means a member in general including the first and second main surfaces 12*a* and 12*b*, the first and second lateral surfaces 12*c* and 12*d*, and the first and second end surfaces 12*e* and 12*f*.

Some or all of the first and second main surfaces 12*a* and 12*b*, the first and second lateral surfaces 12*c* and 12*d*, and the first and second end surfaces 12*e* and 12*f* may include irregularities such as projections and recesses, for example.

As shown in FIGS. 4 and 5, the multilayer body 12 includes the inner layer portion 15*a* that includes the plurality of internal electrode layers 16 opposed to each other in the height direction x connecting the first main surface 12*a* and the second main surface 12*b*, the first outer layer portion 15*b*1 that includes a plurality of dielectric layers 14 located between the first main surface 12*a* and an internal electrode layer 16 closest to the first main surface 12*a*, and the second outer layer portion 15*b*2 that includes a plurality of dielectric layers 14 located between the second main surface 12*b* and an internal electrode layer 16 closest to the second main surface 12*b*.

The first outer layer portion 15*b*1 includes the plurality of dielectric layers 14 that are located adjacent to the first main surface 12*a* of the multilayer body 12, which in other words are the plurality of dielectric layers 14 located between the first main surface 12*a* and the internal electrode layer 16 closest to the first main surface 12*a*.

The second outer layer portion 15*b*2 includes the plurality of dielectric layers 14 that are located adjacent to the second main surface 12*b* of the multilayer body 12, which in other words are the plurality of dielectric layers 14 located between the second main surface 12*b* and the internal electrode layer 16 closest to the second main surface 12*b*.

A region located between the first outer layer portion 15*b*1 and the second outer layer portion 15*b*2 is the inner layer portion 15*a*.

The multilayer body 12 includes end portions 22*b* (L gaps) that are each located between the inner layer portion 15*a* and the first end surface 12*e* or between the inner layer portion 15*a* and the second end surface 12*f*, and that each include extension electrode portions of first internal electrode layers 16*a* or extension electrode portions of second internal electrode layers 16*b* described below.

The number of dielectric layers 14 that are laminated is not particularly limited, but is, for example, preferably 50 or more and 1000 or less, including those in the first outer layer portion 15*b*1 and the second outer layer portion 15*b*2.

Preferably, the dielectric layers 14 have, for example, a thickness of about 0.5 μm or more and about 10 μm or less.

Examples of materials usable for the dielectric layers 14 include a dielectric material. Examples of usable dielectric materials include a dielectric ceramic including $BaTiO_3$, $CaTiO_3$, $SrTiO_3$, or $CaZrO_3$ as a main component. In addition to the main component, the material of the dielectric layers 14 may include a subcomponent in a smaller amount than the main component depending on desired properties of the multilayer body. Examples of subcomponents include a Mn compound, an Fe compound, a Cr compound, a Co compound, and a Ni compound. In particular, the dielectric layers 14 in the present example embodiment preferably include, as an additive, Mg in the form of a single substance or a compound. In the present example, the dielectric layers 14 include MgO.

Internal Electrode Layers

The internal electrode layers 16 include the first internal electrode layers 16*a* and the second internal electrode layers 16*b* as shown in FIGS. 4 and 5. The first internal electrode layers 16*a* and the second internal electrode layers 16*b* are alternately laminated with the dielectric layers 14 therebetween.

The first internal electrode layers 16*a* are disposed on surfaces of dielectric layers 14. Each of the first internal electrode layers 16*a* includes a first counter electrode portion 18*a* opposed to adjacent second internal electrode layers 16*b* and a first extension electrode portion 20*a* that is located at one end of the first internal electrode layer 16*a* and extends from the first counter electrode portion 18*a* to the first end surface 12*e* of the multilayer body 12. An end of the first extension electrode portion 20*a* is located and exposed at the first end surface 12*e*. Specifically, an end of the first counter electrode portion 18*a* is slightly spaced inward from the second end surface 12*f*.

The shape of the first counter electrode portion 18*a* of each first internal electrode layer 16*a* is not particularly limited, but is, for example, preferably rectangular or substantially rectangular in a plan view. However, corner portions thereof may be rounded in a plan view or sloped (tapered) in a plan view.

The shape of the first extension electrode portion 20*a* of each first internal electrode layer 16*a* is not particularly limited, but is, or for example, preferably rectangular substantially rectangular in a plan view. However, corner portions thereof may be rounded in a plan view or sloped (tapered) in a plan view. Furthermore, the corner portions may be each tapered in a plan view with a slope toward one direction.

The second internal electrode layers 16*b* are disposed on surfaces of dielectric layers 14 different from the dielectric layers 14 on which the first internal electrode layers 16*a* are disposed. Each of the second internal electrode layers 16*b* includes a second counter electrode portion 18*b* opposed to adjacent first internal electrode layers 16*a* and a second extension electrode portion 20*b* that is located at one end of the second internal electrode layer 16*b* and extends from the second counter electrode portion 18*b* to the second end surface 12*f* of the multilayer body 12. An end of the second extension electrode portion 20*b* is located and exposed at the second end surface 12*f*. Specifically, an end of the second counter electrode portion 18*b*is slightly spaced inward from the first end surface 12*e*.

The shape of the second counter electrode portion 18*b* of each second internal electrode layer 16*b* is not particularly limited, but is, for example, preferably rectangular or substantially rectangular in a plan view. However, corner portions thereof may be rounded in a plan view or sloped (tapered) in a plan view.

The shape of the second extension electrode portion 20*b* of each second internal electrode layer 16*b* is not particularly limited, but is, example, for preferably rectangular or substantially rectangular in a plan view. However, corner portions thereof may be rounded in a plan view or sloped (tapered) in a plan view. Furthermore, the corner portions may be each tapered in a plan view with a slope toward one direction.

In the present example embodiment, the first counter electrode portions 18*a* of the first internal electrode layers 16*a* and the second counter electrode portions 18*b* of the second internal electrode layers 16*b* are opposed to each other with the dielectric layers 14 therebetween to generate capacitance, resulting in manifestation of capacitor characteristics.

The number of internal electrode layers 16 that are laminated is not particularly limited, but is, for example, preferably 50 or more and 1000 or less. Preferably, the internal electrode layers 16 have a thickness of, for example, about 0.2 μm or more and about 2.0 μm or less.

Furthermore, in the present example embodiment, the first internal electrode layers 16*a* and the second internal electrode layers 16*b* of the internal electrode layers 16 are exposed at the first lateral surface 12*c* and the second lateral surface 12*d* of the multilayer body 12.

Specifically, as shown in FIGS. 5 and 6, each of the first internal electrode layers 16*a* extends to the first lateral surface 12*c*, so that a first end 16*a*1 thereof, which is one of opposite ends in the width direction y, is exposed at the first lateral surface 12*c*. Each of the first internal electrode layers 16*a* also extends to the second lateral surface 12*d*, so that a second end 16*a*2 thereof, which is the other end in the width direction y, is exposed at the second lateral surface 12*d*.

As shown in FIGS. 5 and 7, each of the second internal electrode layers 16*b* extends to the first lateral surface 12*c*, so that a third end 16*b*1 thereof, which is one of opposite ends in the width direction y, is exposed at the first lateral surface 12*c*. Each of the second internal electrode layers 16*b* also extends to the second lateral surface 12*d*, so that a fourth end 16*b*2 thereof, which is the other end in the width direction y, is exposed at the second lateral surface 12*d*.

As described above, the first internal electrode layers 16*a* and the second internal electrode layers 16*b* in the multilayer body 12 are exposed at the first lateral surface 12*c* and the second lateral surface 12*d*. This configuration allows for an increase in the effective area of the internal electrodes, which contribute to generation of capacitance. This configuration also eliminates the need for a step for forming dielectric layers at the lateral ends in the width direction y where the first lateral surface 12*c* and the second lateral surface 12*d* are located, allowing for a reduction in manufacturing costs.

The internal electrode layers 16 may be, for example, made of an electrically conductive material selected from Ni, Cu, Ag, Pd, or Au, or alloys containing at least one of these metals such as a Ag-Pd alloy. In particular, for example, the internal electrode layers 16 according to the present example embodiment preferably include at least Ni.

Furthermore, in the present example embodiment, an insulating Ni-Mg-O phase is preferably provided in regions along the exposed portions of the internal electrode layers 16 at the first lateral surface 12*c* and the second lateral surface 12*d* of the multilayer body 12.

Specifically, as shown in FIGS. 5 and 6 in particular, the first internal electrode layers 16*a* each include a first region 23*a* along the first end 16*a*1 adjacent to the first lateral surface 12*c* and a second region 25*a* along the second end 16*a*2 adjacent to the second lateral surface 12*d*. The Ni-Mg-O phase is provided in the first region 23*a* and the second region 25*a*.

As shown in FIGS. 5 and 7 in particular, the second internal electrode layers 16*b* each include a third region 23*b* along the third end 16*b*1 adjacent to the first lateral surface 12*c* and a fourth region 25*b* along the fourth end 16*b*2 adjacent to the second lateral surface 12*d*. A Ni-Mg-O phase is provided in the third region 23*b* and the fourth region 25*b*.

This configuration ensures insulation in the exposed portions of the first internal electrode layers 16*a* at the first lateral surface 12*c* and the second lateral surface 12*d*. This configuration also ensures insulation in the exposed portions of the second internal electrode layers 16*b* at the first lateral surface 12*c* and the second lateral surface 12*d*.

Since Mg is included as an additive in the ceramic, which is a raw material of the dielectric layers 14, and Ni is included as a raw material of the internal electrode layers 16, NiO generated in the internal electrode layers 16 and MgO included in the dielectric layers 14 form a solid solution in the first regions 23*a* and the second regions 25*a* of the first internal electrode layers 16*a* during firing of the multilayer body 12. Similarly, NiO and MgO form a solid solution in the third regions 23*b* and the fourth regions 25*b* of the second internal electrode layers 16*b*. Through the above, the Ni-Mg-O phase is provided in the first regions 23*a*, the second regions 25*a*, the third regions 23*b*, and the fourth regions 25*b*.

An oxide NiO, which is generated during the firing of the multilayer body 12, also has insulating properties. However, it is advantageous to form the Ni-Mg-O phase in the following respects. That is, the Ni-Mg-O phase is a solid solution, and once formed, cannot undergo decomposition through a redox reaction. By contrast, NiO returns to elemental Ni in a reducing atmosphere. As such, the Ni-Mg-O phase is more chemically stable than Nio, and thus ensures the insulation in the exposed portions of the internal electrode layers 16 at the first lateral surface 12*c* and the second lateral surface 12*d* of the multilayer body 12 with high reliability.

The presence or absence of the Ni-Mg-O phase in the first regions 23*a*, the second regions 25*a*, the third regions 23*b*, and the fourth regions 25*b* can be analyzed by FE-WDX. Alternatively, the presence or absence of the Ni-Mg-O phase can be confirmed by ordinary SEM observation based on a secondary electron image and a backscattered electron image.

In the first internal electrode layers 16*a*, preferably, a dimension WE1 of the first regions 23*a* in the width direction y and a dimension WE2 of the second regions 25*a* in the width direction y, which are each a dimension in the width direction y, are, for example, about 5 μm or more and about 50 μm or less.

In the second internal electrode layers 16*b*, preferably, a dimension WE3 of the third regions 23*b* in the width direction y and a dimension WE4 of the fourth regions 25*b* in the width direction y, which are each a dimension in the width direction y, are, for example, about 5 μm or more and about 50 μm or less. This is based on the following reasons. That is, if the dimensions WE1 to WE4 in the width direction y are less than about 5 μm, the insulation in the first to fourth regions cannot be maintained. On the other hand, if the dimensions WE1 to WE4 in the width direction y are greater than about 50 μm, the effective area of the internal electrodes, which contribute to generation of capacitance, is insufficient. Specifically, the insulating regions (W gaps) located between the inner layer portion 15*a* and the first lateral surface 12*c*, and between the inner layer portion 15*a* and the second lateral surface 12*d* are too large.

Preferably, a coverage ratio K1 of the first internal electrode layers 16*a* on the dielectric layers 14 in the first regions 23*a* and the second regions 25*a* is lower than a coverage ratio K2 of the first internal electrode layers 16*a* on the dielectric layers 14 in a central portion $C_1$ of the multilayer body 12 in the width direction y. The central portion $C_1$ of the multilayer body 12 in the width direction y refers to a region located between the first regions 23*a* and the second regions 25*a* of the first internal electrode layers 16*a* in the width direction y.

Preferably, a coverage ratio K3 of the second internal electrode layers 16*b* on the dielectric layers 14 in the third regions 23*b* and the fourth regions 25*b* is lower than a coverage ratio K4 of the second internal electrode layers 16*b* on the dielectric layers 14 in a central portion $C_2$ of the multilayer body 12 in the width direction y. The central portion $C_2$ of the multilayer body 12 in the width direction y refers to a region located between the third regions 23*b* and the fourth regions 25*b* of the second internal electrode layers 16*b* in the width direction y.

This configuration allows for a substantial reduction in the dimensions of the W gaps and ensures the insulation in the first to fourth regions more effectively.

Preferably, for example, the coverage ratio K1 is about 40% or higher and about 70% or lower, and the coverage ratio K3 is about 40% or higher and about 70% or lower. If the coverage ratios K1 and K3 are lower than about 40%, microcracks are formed in the multilayer body 12 due to volumetric expansion of the Ni-Mg-O phase, and the failure rate is likely to be higher in a moisture resistance test. If the coverage ratios K1 and K3 are higher than about 70%, the percentage of the Ni-Mg-O phase is so low that the insulation in the first to fourth regions is insufficient, resulting in an increase in short-circuit failure rate.

The coverage ratio of the internal electrode layers 16 on the dielectric layers 14 is generally measured as follows. That is, an internal electrode layer 16 and a dielectric layer 14 located in a central portion of the multilayer body 12 in the T direction are separated from each other through electric-field delamination or other method. Next, a central portion (about ½ in the W direction and about ½ in the L direction) and the vicinity thereof of the internal electrode layer 16 thus exposed is observed using a microscope at a magnification of approximately 100×. Thus, an image is obtained and analyzed to determine the percentage of the area occupied by the internal electrode layer 16 in the exposed part as the coverage ratio.

Figures 8A, 8B, 8C:
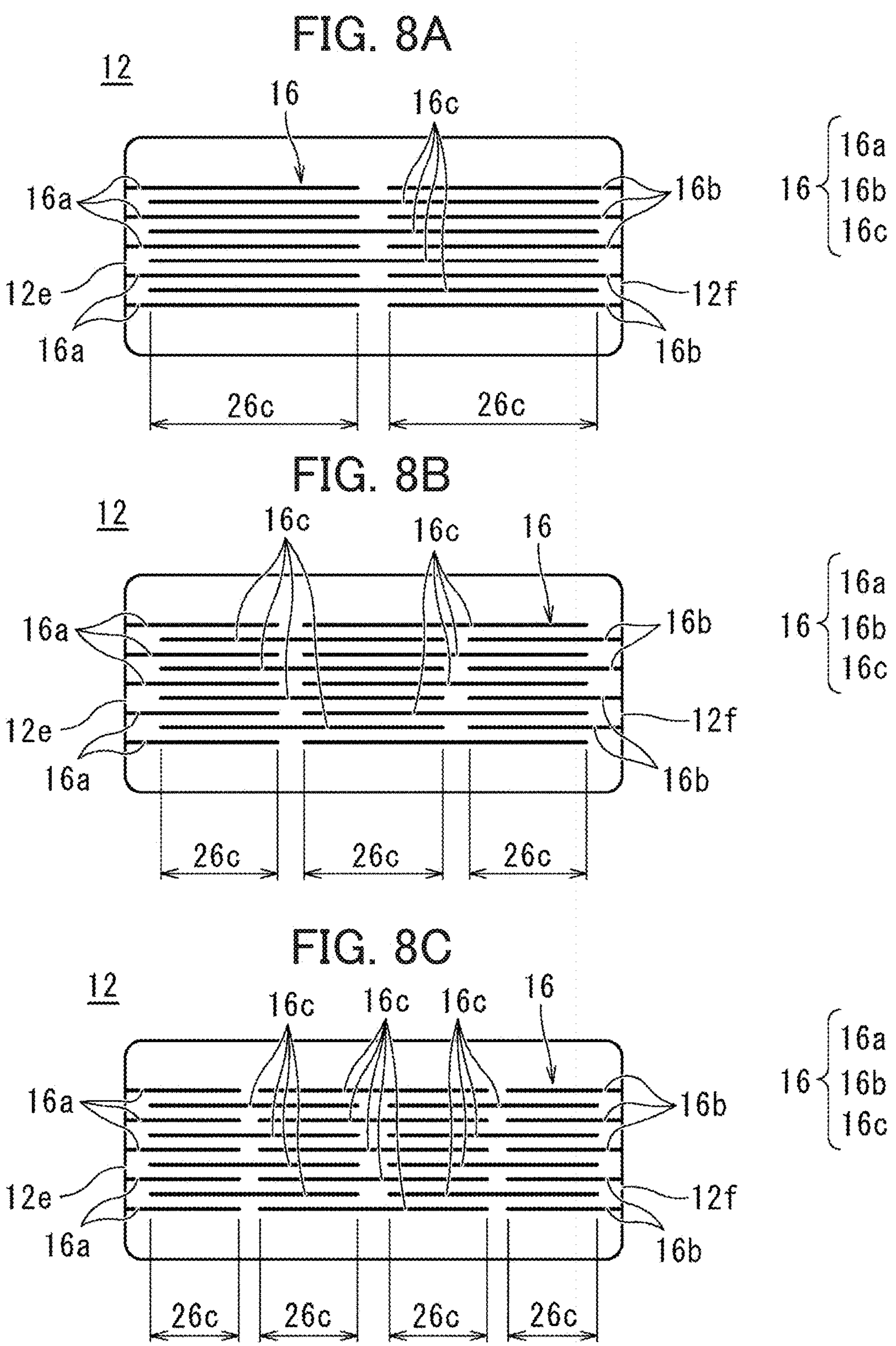
FIG. 8A is a cross-sectional view taken along line II-II in FIG. 1 and shows a structure in which a counter electrode portion of each internal electrode layer of a multilayer ceramic capacitor according to an example embodiment of the present invention is divided into two portions.
FIG. 8B is a cross-sectional view taken along line II-II in FIG. 1 and shows a structure in which the counter electrode portion of each internal electrode layer of a multilayer ceramic capacitor according to an example embodiment of the present invention is divided into three portions.
FIG. 8C is a cross-sectional view taken along line II-II in FIG. 1 and shows a structure in which the counter electrode portion of each internal electrode layer of a multilayer ceramic capacitor according to an example embodiment of the present invention is divided into four portions.

The multilayer body 12 shown in FIG. 1 may have a structure such as shown in FIGS. 8A to 8C, which includes floating internal electrode layers 16*c* that do not extend to the first end surface 12*e* or the second end surface 12*f* in addition to the first internal electrode layers 16*a* and the second internal electrode layers 16*b*, and which includes a plurality of separate counter electrode portions 26*c* based on the floating internal electrode layers 16*c*. For example, the multilayer body 12 may have a two-portion structure shown in FIG. 8A, a three-portion structure shown in FIG. 8B, or a four-portion structure shown in FIG. 8C. The multilayer body 12 may have a four-portion structure or more. As a result of the multilayer body 12 having a structure including the plurality of separate counter electrode portions 26*c*, a plurality of capacitor components are provided between the first internal electrode layers 16*a*, the second internal electrode layers 16*b*, and the floating internal electrode layers 16*c* opposed to each other, providing a configuration in which these capacitor components are connected in series. This configuration allows the voltage that is applied to each capacitor component to be lower, helping achieve higher voltage resistance of the multilayer ceramic capacitor 10.

Like the first internal electrode layers 16*a* and the second internal electrode layers 16*b*, the floating internal electrode layers 16*c* may be, for example, made of an electrically conductive material selected from Ni, Cu, Ag, Pd, and Au, and alloys including at least one of these metals such as a Ag-Pd alloy.

As shown in FIGS. 1 to 3, the external electrodes 30 are disposed on the first end surface 12*e* and the second end surface 12*f* of the multilayer body 12.

Each of the external electrodes 30 includes a base electrode layer 32 including a metal component and glass, and a plated layer 34 disposed on a surface of the base electrode layer 32.

The external electrodes 30 include a first external electrode 30*a* and a second external electrode 30*b*.

The first external electrode 30*a* is connected to the first internal electrode layers 16*a* and is provided at least on the outer side of the first end surface 12*e*. The first external electrode 30*a* extends from the first end surface 12*e* of the multilayer body 12 to be provided also on a portion of the first main surface 12*a* and a portion of the second main surface 12*b*, and a portion of the first lateral surface 12*c* and a portion of the second lateral surface 12*d*. In this configuration, the first external electrode 30*a* is electrically connected to the first extension electrode portions 20*a* of the first internal electrode layers 16*a*.

The second external electrode 30*b* is connected to the second internal electrode layers 16*b* and is provided at least on the outer side of the second end surface 12*f*. The second external electrode 30*b* extends from the second end surface 12*f* of the multilayer body 12 to be provided also on a portion of the first main surface 12*a* and a portion of the second main surface 12*b*, and a portion of the first lateral surface 12*c* and a portion of the second lateral surface 12*d*. In this configuration, the second external electrode 30*b* is electrically connected to the second extension electrode portions 20*b* of the second internal electrode layers 16*b*.

In the multilayer body 12, the first counter electrode portions 18*a* of the first internal electrode layers 16*a* and the second counter electrode portions 18*b* of the second internal electrode layers 16*b* are opposed to each other with the dielectric layers 14 therebetween to generate capacitance. Capacitance can be therefore generated between the first external electrode 30*a* connected to the first internal electrode layers 16*a* and the second external electrode 30*b* connected to the second internal electrode layers 16*b*, resulting in manifestation of capacitor characteristics.

The base electrode layers 32 include a first base electrode layer 32*a* and a second base electrode layer 32*b*.

The first base electrode layer 32*a* is connected to the first internal electrode layers 16*a* and is provided on the outer side of the first end surface 12*e*. The first base electrode layer 32*a* extends from the first end surface 12*e* to be provided also on a portion of the first main surface 12*a* and a portion of the second main surface 12*b*, and a portion of the first lateral surface 12*c* and a portion of the second lateral surface 12*d*. In this configuration, the first base electrode layer 32*a* is electrically connected to the first extension electrode portions 20*a* of the first internal electrode layers 16*a*.

The second base electrode layer 32*b* is connected to the second internal electrode layers 16*b* and is provided on the outer side of the second end surface 12*f*. The second base electrode layer 32*b* extends from the second end surface 12*f* to be provided also on a portion of the first main surface 12*a* and a portion of the second main surface 12*b*, and a portion of the first lateral surface 12*c* and a portion of the second lateral surface 12*d*. In this configuration, the second base electrode layer 32*b* is electrically connected to the second extension electrode portions 20*b* of the second internal electrode layers 16*b*.

Each base electrode layer 32 includes at least one of, for example, a baked layer, an electrically conductive resin layer, or a thin film layer.

The following describes configurations each including baked layers, electrically conductive resin layers, or thin film layers as the base electrode layers 32.

Configuration Including Baked Layers

The baked layers include a metal component and glass. The metal component of the baked layers includes, for example, at least one of Cu, Ni, Ag, Pd, a Ag-Pd alloy, or Au. The baked layers are obtained by applying an electrically conductive paste including glass and a metal onto the multilayer body and baking the electrically conductive paste. The baked layers are formed by simultaneously firing a multilayer chip having the internal electrode layers 16 and the dielectric layers 14, and the electrically conductive paste applied onto the multilayer chip. However, the electrically conductive paste may be baked after the multilayer chip including the internal electrode layers 16 and the dielectric layers 14 has been fired. Each baked layer may include a plurality of layers.

Preferably, a central portion of the first base electrode layer 32*a* located on the first end surface 12*e* in the height direction x has, for example, a thickness of about 10 μm or more and about 150 μm or less in the length direction z connecting the first end surface 12*e* and the second end surface 12*f*.

Preferably, a central portion of the second base electrode layer 32*b* located on the second end surface 12*f* in the height direction x has, for example, a thickness of approximately about 10 μm or more and about 150 μm or less in the length direction z connecting the first end surface 12*e* and the second end surface 12*f*.

Preferably, central portions of the first base electrode layer 32*a* located on the portions of the first main surface 12*a* and the second main surface 12*b* in the length direction Z connecting the first end surface 12*e* and the second end surface 12*f* have, for example, a thickness of about 10 μm or more and about 100 μm or less in the height direction x connecting the first main surface 12*a* and the second main surface 12*b*.

Preferably, central portions of the second base electrode layer 32*b* located on the portions of the first main surface 12*a* and the second main surface 12*b* in the length direction z connecting the first end surface 12*e* and the second end surface 12*f* have, for example, a thickness of about 10 μm or more and about 100 μm or less in the height direction x connecting the first main surface 12*a* and the second main surface 12*b*.

Preferably, central portions of the first base electrode layer 32*a* located on the portions of the first lateral surface 12*c* and the second lateral surface 12*d* in the length direction z connecting the first end surface 12*e* and the second end surface 12*f* have, for example, a thickness of about 10 μm or more and about 100 μm or less in the width direction y connecting the first lateral surface 12*c* and the second lateral surface 12*d*.

Preferably, central portions of the second base electrode layer 32*b* located on the portions of the first lateral surface 12*c* and the second lateral surface 12*d* in the length direction z connecting the first end surface 12*e* and the second end surface 12*f* have, for example, a thickness of about 10 μm or more and about 100 μm or less in the width direction y connecting the first lateral surface 12*c* and the second lateral surface 12*d*.

Configuration Including Electrically Conductive Resin Layers

The electrically conductive resin layers include a first electrically conductive resin layer and a second electrically conductive resin layer.

Preferably, the first electrically conductive resin layer is provided additionally to cover another layer such as the baked layer as the first base electrode layer 32*a*. Preferably, the second electrically conductive resin layer is provided additionally to cover another layer such as the baked layer as the second base electrode layer 32*b*.

Specifically, the first electrically conductive resin layer and the second electrically conductive resin layer are provided as the first base electrode layer 32*a* and the second base electrode layer 32*b* on top of other layers such as the baked layers located on top of the first end surface 12*e* and the second end surface 12*f*. Preferably, the first electrically conductive resin layer and the second electrically conductive resin layer are provided to extend to other layers such as the baked layers located on top of the first main surface 12*a* and the second main surface 12*b*, and the first lateral surface 12*c* and the second lateral surface 12*d*. However, the first electrically conductive resin layer and the second electrically conductive resin layer may be provided only on top of other layers such as the baked layers located on top of the first end surface 12*e* and the second end surface 12*f*.

Preferably, the first electrically conductive resin layer and the second electrically conductive resin layer have, for example, a thickness of about 10 μm or more and about 200 μm or less.

The first electrically conductive resin layer and the second electrically conductive resin layer include, for example, a thermosetting resin and a metal component.

As a result of including a thermosetting resin, the first electrically conductive resin layer and the second electrically conductive resin layer are more flexible than, for example, the base electrode layers 32 formed of a plated film or a fired electrically conductive paste. The electrically conductive resin layers can therefore define and function as buffer layers to prevent formation of cracks in the multilayer ceramic capacitor 10 even if the multilayer ceramic capacitor 10 is subjected to a physical shock or a shock resulting from thermal cycling.

Specific examples of usable thermosetting resins include various known thermosetting resins such as epoxy resins, phenol resins, urethane resins, silicone resins, and polyimide resins. In particular, epoxy resins, which have excellent heat resistance, moisture resistance, and adhesion, are one of the most suitable resins.

Preferably, the first electrically conductive resin layer and the second electrically conductive resin layer include a curing agent along with the thermosetting resin. The first electrically conductive resin layer and the second electrically conductive resin layer may include an epoxy resin as a base resin. Examples of curing agents usable for the epoxy resin include various known compounds such as phenolic compounds, amine compounds, anhydride compounds, and imidazole compounds.

Examples of metals that can be included in the first electrically conductive resin layer and the second electrically conductive resin layer include Ag, Cu, and an alloy thereof. Metal powder having a Ag-coated surface is also usable. In a case where metal powder having a Ag-coated surface is used, preferably, Cu or Ni is used as the metal powder.

Furthermore, for example, antioxidant treated Cu is also usable. The use of a Ag-coated metal provides a choice for an inexpensive base material metal while maintaining the properties of Ag.

Preferably, for example, the first electrically conductive resin layer and the second electrically conductive resin layer each include a metal in an amount of about 35 vol % or more and about 75 vol % or less relative to the total volume of the electrically conductive resin.

No particular limitations are placed on the shape of the metal included in the first electrically conductive resin layer and the second electrically conductive resin layer. For example, a spherical or flat electrically conductive filler may be contained.

No particular limitations are placed on the average particle diameter of the metal included in the first electrically conductive resin layer and the second electrically conductive resin layer. For example, an electrically conductive filler having an average particle diameter of about 0.3 μm or more and about 10 μm or less may be contained.

The metal included in the first electrically conductive resin layer and the second electrically conductive resin layer is mainly responsible for the electrical conductivity of the electrically conductive resin layers. Specifically, particles of the electrically conductive filler make contact with each other to provide electrical paths inside the electrically conductive resin layers.

A metal having, for example, a spherical or flat particle shape may be used for the first electrically conductive resin layer and the second electrically conductive resin layer. Preferably, spherical metal powder and flat metal powder are used in combination.

Each of the electrically conductive resin layers may be directly provided on the multilayer body without providing a baked layer therebetween.

Configuration Including Thin Film Layers

In a configuration including thin film layers as the base electrode layers 32, the thin film layers include deposited metal particles and have a thickness of, for example, about 10 μm or less. The thin film layers are formed by a thin film formation method such as sputtering or vapor deposition, for example.

With reference to FIGS. 2 and 3, the following describes the plated layers 34, which are the first plated layer 34*a* and the second plated layer 34*b*, respectively disposed on top of the base electrode layers 32.

The first plated layer 34*a* and the second plated layer 34*b* include, for example, at least one of Cu, Ni, Sn, Ag, Pd, a Ag-Pd alloy, or Au.

The first plated layer 34*a* is disposed to completely cover the first base electrode layer 32*a*. The second plated layer 34*b* is disposed to completely cover the second base electrode layer 32*b*.

The first plated layer 34*a* and the second plated layer 34*b* may each include a plurality of layers. In this case, for example, the plated layer 34 preferably has a two-layer structure including a lower plated layer (Ni plated layer) provided on the base electrode layer 32 by Ni plating and an upper plated layer (Sn plated layer) provided on the lower plated layer by Sn plating. In other words, in this case, the first plated layer 34*a* includes a first lower plated layer and a first upper plated layer located on a surface of the first lower plated layer. The second plated layer 34*b* includes a second lower plated layer and a second upper plated layer located on a surface of the second lower plated layer.

The lower plated layers made of Ni plating are used to prevent the base electrode layers 32 from being corroded by solder when the multilayer ceramic capacitor 10 is mounted, and the upper plated layers made of Sn plating are used to improve the wettability of solder when the multilayer ceramic capacitor 10 is mounted, facilitating the mounting.

Preferably, the thickness per layer of each of the upper and lower plated layers is about 1.0 μm or more and about 15.0 μm or less, for example.

A dimension of the multilayer ceramic capacitor 10 including the multilayer body 12, the first external electrode 30*a*, and the second external electrode 30*b* in the length direction z is referred to as an L dimension. A dimension of the multilayer ceramic capacitor 10 including the multilayer body 12, the first external electrode 30*a*, and the second external electrode 30*b* in the height direction x is referred to as a T dimension. A dimension of the multilayer ceramic capacitor 10 including the multilayer body 12, the first external electrode 30*a*, and the second external electrode 30*b* in the width direction y is referred to as a W dimension. For example, the multilayer ceramic capacitor 10 has an L dimension in the length direction z of about 0.2 mm or more and about 10.0 mm or less, a W dimension in the width direction y of about 0.1 mm or more and about 10.0 mm or less, and a T dimension in the height direction x of about 0.1 mm or more and about 5.0 mm or less. The dimensions of the multilayer ceramic capacitor 10 can be measured using a microscope.

In the multilayer ceramic capacitor 10 according to the present example embodiment shown in FIG. 1, each of the first internal electrode layers 16*a* and the second internal electrode layers 16*b* of the internal electrode layers 16 is exposed at the first lateral surface 12*c* and the second lateral surface 12*d* of the multilayer body 12. This configuration allows the multilayer ceramic capacitor 10 to achieve an increase in the effective area of the internal electrodes, which contributes to generation of capacitance. This configuration also eliminates the need for a step for forming dielectric layers at the lateral ends in the width direction y where the first lateral surface 12*c* and the second lateral surface 12*d* are located, allowing for a reduction in manufacturing costs for the multilayer ceramic capacitor 10.

In the internal electrode layers 16 of the multilayer ceramic capacitor 10, preferably, the insulating Ni-Mg-O phase is provided in the first regions 23*a* along the first ends 16*a*1 adjacent to the first lateral surface 12*c* of the multilayer body 12 and the second regions 25*a* along the second ends 16*a*2 adjacent to the second lateral surface 12*d* of the multilayer body 12, and in the third regions 23*b* along the third ends 16*bl* adjacent to the first lateral surface 12*c* of the multilayer body 12 and the fourth regions 25*b* along the fourth ends 16*b*2 adjacent to the second lateral surface 12*d* of the multilayer body 12. This configuration ensures the insulation in the exposed portions of the first internal electrode layers 16*a* at the first lateral surface 12*c* and the second lateral surface 12*d*, and the insulation in the exposed portions of the second internal electrode layers 16*b* at the first lateral surface 12*c* and the second lateral surface 12*d*.

In the first internal electrode layers 16*a* of the multilayer ceramic capacitor 10, preferably, the dimension WE1 of the first regions 23*a* in the width direction y and the dimension WE2 of the second regions 25*a* in the width direction y, which are each a dimension in the width direction y, are, for example, about 5 μm or more and about 50 μm or less. In the second internal electrode layers 16*b*, preferably, the dimension WE3 of the third regions 23*b* in the width direction y and the dimension WE4 of the fourth regions 25*b* in the width direction y, which are each a dimension in the width direction y, are, for example, about 5 μm or more and about 50 μm or less.

Preferably, the coverage ratio K1 of the first internal electrode layers 16*a* on the dielectric layers 14 in the first regions 23*a* and the second regions 25*a* is lower than the coverage ratio K2 of the first internal electrode layers 16*a* on the dielectric layers 14 in the central portion $C_1$ of the multilayer body 12 in the width direction y. Preferably, the coverage ratio K3 of the second internal electrode layers 16*b* on the dielectric layers 14 in the third regions 23*b* and the fourth regions 25*b* is lower than the coverage ratio K4 of the second internal electrode layers 16*b* on the dielectric layers 14 in the central portion $C_2$ of the multilayer body 12 in the width direction y. This configuration allows for a substantial reduction in the dimensions of the W gaps and ensures the insulation in the first to fourth regions more effectively.

In the multilayer ceramic capacitor 10, for example, preferably, the coverage ratio K1 is about 40% or higher and about 70% or lower, and the coverage ratio 3 is about 40% or higher and about 70% or lower.

2. Multilayer Ceramic Capacitor Manufacturing Method

The following describes an example of a method for manufacturing the multilayer ceramic capacitor.

(1) Dielectric sheets and an electrically conductive paste for forming internal electrode layers are prepared. The dielectric sheets and the electrically conductive paste for forming internal electrode layers each include a binder (for example, a known organic binder) and a solvent (for example, a known organic solvent).

(2) Next, the electrically conductive paste for forming internal electrode layers is printed on the dielectric sheets in stripe patterns by, for example, screen printing or gravure printing to prepare dielectric sheets having a first internal electrode pattern corresponding to the first internal electrode layers and dielectric sheets having a second internal electrode pattern corresponding to the second internal electrode layers. Dielectric sheets having no internal electrode pattern printed thereon are also prepared for forming outer layers.

(3) A predetermined number of dielectric sheets including no internal electrode pattern prepared for forming outer layers are laminated to form a laminate that serves as an outer layer portion. On top of this laminate, the dielectric sheets including the first internal electrode pattern and the dielectric sheets including the second internal electrode pattern are sequentially laminated so as to be offset in the width direction (short-side direction) of the stripe patterns to form a laminate that serves as an inner layer portion.

(4) A predetermined number of dielectric sheets including no internal electrode pattern printed thereon are further laminated on the internal electrode pattern corresponding to the internal electrode layer located on the outermost surface of the inner layer portion to form a laminate that serves as an outer layer portion. As a result, a multilayer sheet is produced.

(5) The multilayer sheet is pressed in the lamination direction by, for example, hydrostatic pressing or other method to produce a multilayer block.

(6) Multilayer chips are cut out from the multilayer block by cutting the multilayer block into a predetermined size. In this step, corner portions and ridge portions of each multilayer chip may be rounded by barrel polishing or other method, for example.

(7) Each multilayer chip is fired to produce the multilayer body 12. The firing temperature depends on the ceramic and the material of the internal electrode layers 16, but is, for example, preferably about 900° C. or higher and about 1400° C. or lower. In particular, for example, the Ni-Mg-O phase can be formed in the regions along both ends of the dimension of the internal electrode layers 16 in the width direction y in the fired multilayer body 12 by adjusting the oxygen concentration at a temperature in a range of about 900° C. or higher and about 1100° C. or lower.

(8) Subsequently, each base electrode layer is formed. In the present example embodiment, a baked layer is formed as the base electrode layer. An electrically conductive paste including a glass component and a metal component is prepared for each of the first and second base electrode layers.

(9) The electrically conductive paste is applied onto the opposite end surfaces of the multilayer body 12, which are the first and second end surfaces, by an application method such as, for example, dipping or screen printing, followed by baking. As a result, the first and second base electrode layers are formed. The baking temperature is, for example, preferably about 700° C. or higher and about 900° C. or lower.

(10) In a configuration having electrically conductive resin layers as the base electrode layers, the electrically conductive resin layers can be formed as described below. The electrically conductive resin layers may be formed on surfaces of the baked layers, or may be formed directly on the multilayer body without forming the baked layers therebetween.

The electrically conductive resin layers are formed by applying an electrically conductive resin paste including a thermosetting resin and a metal component onto the baked layers or the multilayer body 12, and thermally curing the resin through heat treatment at a temperature of, for example, about 250° C. or higher and about 550° C. or lower. Preferably, for example, the heat treatment is performed under a $N_2$ atmosphere. Preferably, for example, the oxygen concentration is kept at about 100 ppm or lower to prevent scattering of the resin and oxidation of any metal component.

The electrically conductive resin paste can be, for example, applied by using a method involving extruding the electrically conductive resin paste through a slit or a roller transfer method.

(11) Each plated layer is formed by performing plating on a surface of the corresponding base electrode layer. In the present example embodiment, two plated layers are formed on the surfaces of the first base electrode layer and the second base electrode layer. Specifically, a Ni plated layer is formed on each of the first and second base electrode layers, and a Sn plated layer is formed on each of the Ni plated layers. The Ni plated layer and the Sn plated layer are sequentially formed by, for example, a barrel plating method.

As described above, the multilayer ceramic capacitor 10 according to the example embodiment shown in FIG. 1 is manufactured.

3. Experimental Example

In order to confirm the advantageous effects of multilayer ceramic capacitors according to example embodiments of the present invention described above, an experiment was conducted. In the experiment, multilayer ceramic capacitors were produced as experimental samples in accordance with the manufacturing method described above, and changes in insulation and capacitance resulting from variations or lack of variation in the first to fourth regions in the width direction y were determined.

(1) Specifications of Samples in Experimental Example

First, sample multilayer ceramic capacitors according to Examples 1 to 7 with the following specifications were produced in accordance with the multilayer ceramic capacitor manufacturing method described above. A multilayer ceramic capacitor according to a Comparative Example was produced by performing the firing at a temperature in the range of about 900° C. or higher and about 1100° C. or lower in step (7) of the manufacturing method while adjusting the oxygen concentration to a lower level than in Examples.

Specifications of Multilayer Ceramic Capacitors

Dimensions of multilayer ceramic capacitor (design values): L×W×T=about 1.17 mm×about 0.68 mm×about 0.68 mm Ceramic material used as main component of dielectric layers: $BaTiO_3$ Capacitance: about 22 μF Material of internal electrode layers: Ni Composition of external electrodes: electrically conductive metal (Cu) and glass component Plated layers Two layers: Ni plated layer and Sn plated layer Thickness of Ni plated layer: approximately 3 μm Thickness of Sn plated layer: approximately 5 μm

(2) Insulation (IR) Evaluation Method

Insulation of each multilayer capacitor was measured using a digital ultra high resistance/micro current meter (5451, product of ADCMT) at a rated voltage of about 6.3 V for one minute. Insulation (IR) was evaluated in accordance with the following criteria based on a standard defined as a Log (IR) value of about 6.8 or greater (150 Ω·F) while accommodating fluctuations: Poor (indicated by cross symbol (x)): about 6.8 or less; Fair (indicated by triangle symbol (Δ)): about 6.9 or greater and about 7.4 or less; and Good (indicated by circle symbol (o)): about 7.5 or greater.

(3) Capacitance (Cap) Measurement Method

Capacitance (Cap) of each multilayer capacitor was measured. Specifically, capacitance (c) was measured at about 120 Hz and about 0.5 Vrms using a meter (4278A, product of Agilent Technologies). Capacitance (Cap) was evaluated in accordance with the following criteria: Poor (indicated by cross symbol (x)): less than 16.0 and about 25.3 or greater; Fair (indicated by triangle symbol (Δ)): about 16.0 or greater and less than 18.7; and Good (indicated by circle symbol (o)): about 18.7 or greater and less than 25.3.

(4) Results

Table 1 shows the results of the insulation evaluation and the capacitance evaluation for the dielectric layers of the multilayer bodies according to Examples 1 to 7 and Comparative Example, as well as the results of overall evaluation.

TABLE 1

| | Dimension of First to Fourth Regions in Width Direction (μm) | Insulation Log (IR) | Insulation Evaluation | Capacitance (μF) | Capacitance Evaluation | Overall Evaluation |
|---|---|---|---|---|---|---|
| Example 1 | 2 | 7.2 | Δ | 22.8 | ○ | Δ |
| Example 2 | 5 | 8 | ○ | 22.6 | ○ | ○ |
| Example 3 | 10 | 8.2 | ○ | 22.3 | ○ | ○ |
| Example 4 | 25 | 8.4 | ○ | 20.8 | ○ | ○ |
| Example 5 | 50 | 8.3 | ○ | 19.3 | ○ | ○ |
| Example 6 | 75 | 8.4 | ○ | 17.8 | Δ | Δ |
| Example 7 | 100 | 8.4 | ○ | 16.3 | Δ | Δ |
| Comparative Example | — | 0 | x | — | x | x |

Table 1 shows that the insulation was ensured in each of the samples according to Examples 1 to 7 since the internal electrode layers thereof included the first to fourth regions, which have the Ni-Mg-O phase provided therein.

The results of the insulation measurement indicate that the samples according to Examples 2 to 5, in particular, each had good insulation, which was greater than about 7.5, since the first to fourth regions, which have the Ni-Mg-O phase provided therein, of the internal electrode layers thereof had a length in the width direction y of about 5 μm or more and about 50 μm or less.

Furthermore, the results of the capacitance measurement for the samples according to Examples 1 to 7 confirm that reducing the length in the width direction y of the first to fourth regions, which have the Ni-Mg-O phase provided therein, of the internal electrode layers can increase the effective area of the internal electrode layers, allowing for an increase in capacitance.

By contrast, the sample according to Comparative Example had satisfactory capacitance but lacked insulation since the internal electrode layers thereof did not have the first to fourth regions, which have the Ni-Mg-O phase formed therein.

These results demonstrate that example embodiments of the present invention achieves an increase in the effective area of the internal electrodes, which contribute to generation of capacitance, as a result of the internal electrode layers including the first to fourth regions, which have the Ni-Mg-O phase provided therein. The results also suggest that example embodiments of the present invention can eliminate the need for a step for forming dielectric layers at the lateral ends in the width direction y where the first lateral surface and the second lateral surface are located, allowing for a reduction in manufacturing costs for the multilayer ceramic capacitor 10, and ensuring the insulation in the exposed portions of the first internal electrode layers at the first lateral surface and the second lateral surface, and in the exposed portions of the second internal electrode layers at the first lateral surface and the second lateral surface.

Although example embodiments of the present invention have been described above, the present invention is not limited thereto.

While example embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic capacitor comprising:

a multilayer body including a plurality of dielectric layers laminated in a lamination direction, the multilayer body including a first main surface and a second main surface opposed to each other in the lamination direction, a first lateral surface and a second lateral surface opposed to each other in a width direction orthogonal or substantially orthogonal to the lamination direction, and a first end surface and a second end surface opposed to each other in a length direction orthogonal or substantially orthogonal to the lamination direction and the width direction;

first internal electrode layers on the dielectric layers and exposed at the first end surface;

second internal electrode layers on the dielectric layers and exposed at the second end surface;

a first external electrode including a base electrode layer disposed on the first end surface and a plated layer on the base electrode layer; and a second external electrode including a base electrode layer on the second end surface and a plated layer on the base electrode layer; wherein the first internal electrode layers are exposed at the first lateral surface and the second lateral surface;

the second internal electrode layers are exposed at the first lateral surface and the second lateral surface;

the first internal electrode layers each include a first region along an end thereof adjacent to the first lateral surface of the multilayer body and a second region along an end thereof adjacent to the second lateral surface of the multilayer body;

the first region and the second region include a Ni-Mg-O phase therein;

the second internal electrode layers each include a third region along an end thereof adjacent to the first lateral surface of the multilayer body and a fourth region along an end thereof adjacent to the second lateral surface of the multilayer body;

the third region and the fourth region include a Ni-Mg-O phase therein; and at least a portion of the Ni-Mg-O phase of at least one of the first region, the second region, the third region, and the fourth region is exposed at a portion of at least one of the first lateral surface and the second lateral surface that defines an outermost surface of the multilayer ceramic capacitor.

2. The multilayer ceramic capacitor according to claim 1, wherein the first region and the second region each have a dimension in the width direction of about 5 μm or more and about 50 μm or less; and the third region and the fourth region each have a dimension in the width direction of about 5 μm or more and about 50 μm or less.

3. The multilayer ceramic capacitor according to claim 1, wherein the dielectric layers include at least Mg.

4. The multilayer ceramic capacitor according to claim 1, wherein a number of the dielectric layers is 50 or more and 100 or less.

5. The multilayer ceramic capacitor according to claim 1, wherein a thickness of each of the dielectric layers is about 0.5 μm or more and about 10 μm or less.

6. The multilayer ceramic capacitor according to claim 1, wherein each of the dielectric layers includes $BaTiO_3$, $CaTiO_3$, $SrTiO_3$, or $CaZrO_3$ as a main component.

7. The multilayer ceramic capacitor according to claim 6, wherein each of the dielectric layers includes a Mn compound, an Fe compound, a Cr compound, a Co compound, or a Ni compound as a subcomponent.

8. The multilayer ceramic capacitor according to claim 1, wherein each of the first and second internal electrode layers has a rectangular or substantially rectangular shape.

9. The multilayer ceramic capacitor according to claim 1, wherein a number of the first and second internal electrode layers is 50 or more and 1000 or less.

10. The multilayer ceramic capacitor according to claim 1, wherein a thickness of each of the first and second internal electrode layers is about 0.2 μm or more and about 2.0 μm or less.

11. The multilayer ceramic capacitor according to claim 1, wherein a dimension of each of the first and second internal electrode layers is about 5 μm or more and about 50 μm or less.

12. The multilayer ceramic capacitor according to claim 1, wherein each of the first and second internal electrode layers includes Ni, Cu, Ag, Pd, or Au, or an alloy including at least one of Ni, Cu, Ag, Pd, or Au.

13. The multilayer ceramic capacitor according to claim 1, wherein each of the base electrode layers of the first and second external electrodes includes a baked layer.

14. The multilayer ceramic capacitor according to claim 13, wherein the baked layer includes at least one of Cu, Ni, Ag, Pd, a Ag-Pd alloy, or Au.

15. The multilayer ceramic capacitor according to claim 13, wherein a thickness of a central portion of baked layer is about 10 μm or more and about 150 μm or less.

16. The multilayer ceramic capacitor according to claim 1, wherein each of the base electrode layers of the first and second external electrodes includes a conductive resin layer.

17. The multilayer ceramic capacitor according to claim 16, wherein a thickness of the conductive resin layer is about 10 μm or more and about 200 μm or less.

18. The multilayer ceramic capacitor according to claim 16, wherein the conductive resin layer includes a thermosetting resin and a metal component.

19. The multilayer ceramic capacitor according to claim 18, wherein the thermosetting resin includes epoxy resins, phenol resins, urethane resins, silicone resins, or polyimide resins.

20. The multilayer ceramic capacitor according to claim 18, wherein the metal component includes Ag or Cu, or an alloy of Ag or Cu.

21. The multilayer ceramic capacitor according to claim 1, wherein a coverage ratio K1 of the first internal electrode layers on the dielectric layers in the first regions and the second regions is lower than a coverage ratio K2 of the first internal electrode layers on the dielectric layers in a central portion of the multilayer body in the width direction; and a coverage ratio K3 of the second internal electrode layers on the dielectric layers in the third regions and the fourth regions is lower than a coverage ratio K4 of the second internal electrode layers on the dielectric layers in a central portion of the multilayer body in the width direction.

22. The multilayer ceramic capacitor according to claim 21, wherein the coverage ratio K1 is about 40% or higher and about 70% or lower, and the coverage ratio K3 is about 40% or higher and about 70% or lower.

* * * * *